UNITED STATES PATENT OFFICE.

CHARLES E. MATHEWS, OF RIO, WISCONSIN.

CHLORATE-POWDER.

No. 811,941. Specification of Letters Patent. Patented Feb. 6, 1906.

Application filed September 9, 1905. Serial No. 277,795.

*To all whom it may concern:*

Be it known that I, CHARLES E. MATHEWS, a citizen of the United States, residing at Rio, county of Columbia, and State of Wisconsin, have invented a new and useful Improvement in High Explosives or Smokeless Powder, of which the following is a specification.

The component parts of my composition are as follows, combined in substantially the proportions stated: gasolene, one part; spirits of turpentine, one part; alcohol, one part; water, two parts.

The above ingredients are stirred so as to become thoroughly mixed and combined.

I next make the following composition: granulated sugar, one part; potassium chlorate, one and one-half parts. These last-named ingredients I first thoroughly mix by any suitable mechanical means, after which enough of the first-named liquid mixture is added to the last-named ingredient to sufficiently moisten the same while being briskly stirred for several minutes. This I have found to make an exceedingly high explosive at very small cost, which has the advantage of not being dangerous to manufacture or handle after being manufactured and which does not absorb moisture from the atmosphere, can be used with equal efficiency in any condition of weather, is absolutely smokeless, does not soil the gun, and its tension is much higher than the ordinary forms of powder, thus requiring a less amount for a given charge. It is to be mentioned that the turpentine is diluted.

After the compound is prepared as above described it can be molded into any form desired, or it may be ground or otherwise formed into grains.

What I claim as new and useful is—

1. The herein-described composition of matter comprising gasolene, spirits of turpentine, alcohol, water, sugar, and potassium chlorate, substantially as described.

2. The herein-described composition of matter composed of one part granulated sugar, one and one-half parts potassium chlorate, and enough of liquid composed of one part gasolene, one part spirits of turpentine, one part alcohol, and two parts water to moisten the mixture.

In testimony whereof I have hereunto affixed my signature in the presence of two subscribing witnesses.

CHARLES E. MATHEWS.

Witnesses:
   H. S. HENDRICKSON,
   DANIEL E. BERG.